United States Patent [19]

Craig

[11] 4,101,036
[45] Jul. 18, 1978

[54] SUPPORT COLUMN WITH CEILING THRUSTERS

[76] Inventor: Paul M. Craig, 858 Lomita St., El Segundo, Calif. 90245

[21] Appl. No.: 759,253

[22] Filed: Jan. 14, 1977

[51] Int. Cl.² .............................................. A47F 5/00
[52] U.S. Cl. ..................................... 211/86; 248/356; 248/357
[58] Field of Search ................. 211/86, 107, 110, 112; 248/170, 188.7, 356, 357, 431; 240/81 A; 214/15 W

[56] References Cited

U.S. PATENT DOCUMENTS

| | | | |
|---|---|---|---|
| 1,641,832 | 9/1927 | Skinner | 211/86 X |
| 2,845,243 | 7/1958 | Mowers et al. | 248/170 X |
| 2,991,040 | 7/1961 | Levy | 248/356 |
| 3,003,646 | 10/1961 | Wolf | 211/107 |
| 3,018,898 | 1/1962 | Frazelle | 211/86 |
| 3,035,708 | 5/1962 | Freeman | 211/86 |
| 3,645,487 | 2/1972 | Gilchrist | 248/357 X |
| 3,771,665 | 11/1973 | Potter | 211/107 |
| 3,827,665 | 8/1974 | Kistler | 248/357 X |
| 3,828,937 | 8/1974 | Nash | 211/86 |

FOREIGN PATENT DOCUMENTS

| | | | |
|---|---|---|---|
| 748,729 | 12/1966 | Canada | 211/86 |
| 620,781 | 5/1961 | Italy | 211/86 |
| 37,710 | 12/1967 | Japan | 211/107 |
| 331,792 | 8/1958 | Switzerland | 211/86 |
| 625,839 | 7/1949 | United Kingdom | 248/170 |
| 712,739 | 7/1954 | United Kingdom | 248/357 |

*Primary Examiner*—Thomas J. Holko
*Attorney, Agent, or Firm*—Wm. Jacquet Gribble

[57] ABSTRACT

A hollow support column raises from a floor pad and terminates in an adjustable shaft within the top of the column which in turn supports articulated ceiling thrust arms. The arms diverge from the axis of the column and are padded for contact with the ceiling. Preferably three arms are used and their articulation adapts to use near corners and vertical walls and against uneven ceilings. A lock collar positions the thrust arms above the column for compression fastening between the floor and ceiling. A plurality of fastener bands is fixed to the outside of the column. The bands are pierced to receive pairs of fastener pegs on each of a plurality of support arms which cantilever outwardly from the post. The arms may support a variety of objects such as plants, artistic mobiles, tables, hydroponic planters and other objects of some considerable mass since the ceiling thrust arms establish a force triangle with the floor pad as the apex, greatly increasing the capacity of the pole to support weight displaced from the vertical axis of the pole.

1 Claim, 7 Drawing Figures

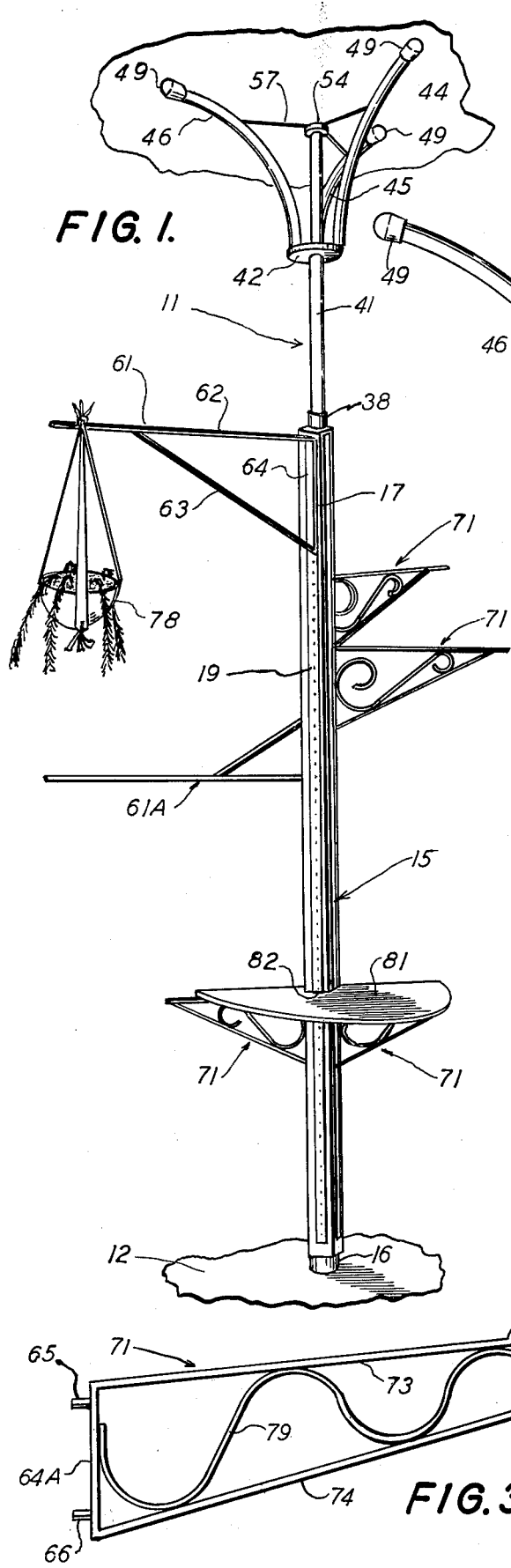
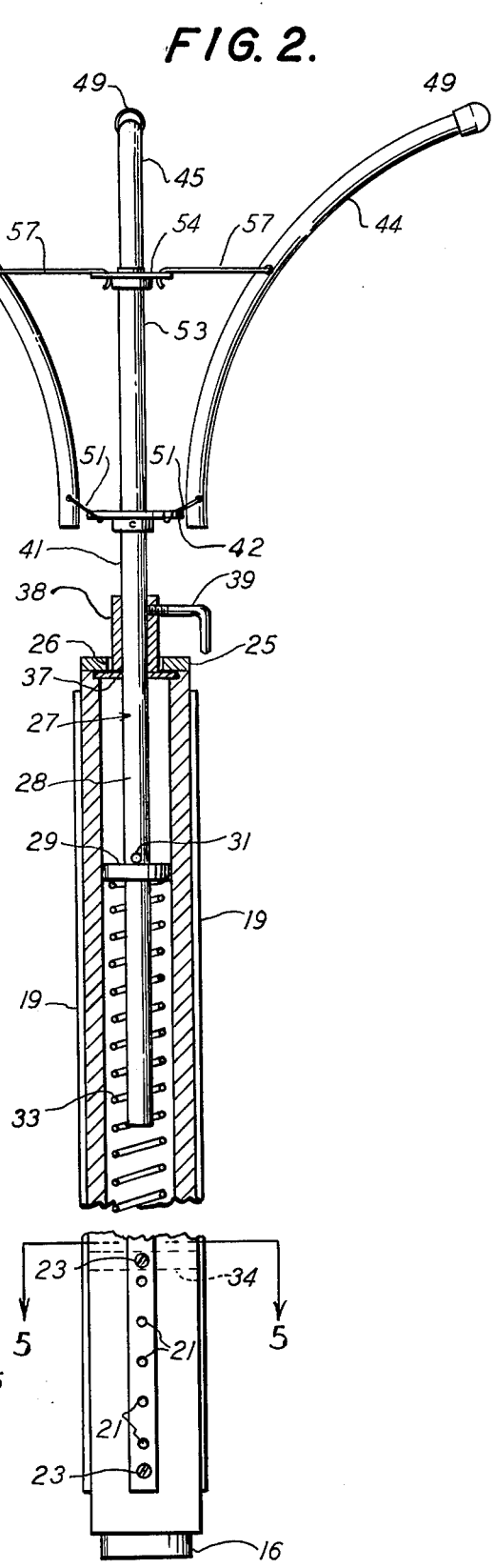

SUPPORT COLUMN WITH CEILING THRUSTERS

BACKGROUND OF THE INVENTION

Decorative and utilitarian support poles have commonly been used both in commercial and domestic buildings. Lamps, clothing racks, plant displays and TV supports have all utilized the facility of placement which support poles, based upon floor-ceiling tension, afford. A limitation of the conventional support pole with its single spring biased thrust lever against the ceiling is that lateral moment caused by weights impinging upon the pole at a distance from the pole axis overcome the tension bond between the ceiling and the pole collapses. The present invention overcomes this disadvantage in a simple manner commensurate with present manufacturing techniques and within the price structure of the particular object by a unique application of force vector geometry.

SUMMARY OF THE INVENTION

The invention contemplates a support pole between floor and ceiling which comprises a hollow vertical column rising from a floor pad and terminating in an adjustable central shaft housed in part in the upper portion of the column. A lock collar on the exterior of the column affords means for fixing the shaft with respect to the column. Preferably an inward spring biases the shaft relative to the column. A support assembly at the top of the shaft exterior of the column supports three thrust arms. Articulated means secure each thrust arm to the assembly. A short post rises from the support assembly and a tension tie extends from the post to each thrust arm to maintain the attitude of the thrust arm with respect to the column without unduly inhibiting arm articulation with respect to the flange. Preferably the outer end of each thrust arm is padded.

A plurality of fastener bands is fixed to the exterior of the column. Each band has a multiplicity of vertically spaced orifices. The orifices accept mounting pegs of one or more support beams, each of which comprises a fastener bar from which the pegs extend and a cantilever beam adapted to extend away from the support column. The beams may take many shapes and support many different loads.

Preferably each cantilever beam has a flat support surface which extends at a perpendicular to the vertical column. Each beam may have a diagonal brace running from the outer end of the beam to a portion of the fastener bar displaced from the point or origin of the cantilever beam on the fastener bar.

The support column of the invention may be decorative, functional, or may be a combination of both. The vertical column is preferably square in cross section, thus having four outer vertical faces. However the invention does not preclude a vertical column having the configuration of a hexagonal or octagonal prism and, indeed, the post may be cylindrical.

The materials of the inventive apparatus may be metallic, wood or plastic. In any case fabrication methods are conventional and the apparatus of the invention may be fabricated from stock materials readily available on the market.

The support column is used by placing the vertical column upright and adjusting the shaft until the articulated arms thrust against the ceiling, with positions of the individual arms within the freedom of their articulation being dictated by the contours of the ceiling and the proximity of the vertical column to a vertical wall. After placement of the thrust arms against the ceiling the shaft collar is locked and the proper thrust pattern is established between floor, column and ceiling. Support beams of the cantilever type are then placed in the orifices of the fastener bands of the vertical column and the beams are ready to support whatever load is desired.

These and other advantages of the invention are apparent from the following detailed description and drawing.

BRIEF DESCRIPTION OF THE DRAWING

FIG. 1 is a perspective view of a support column in accordance with the invention in place between a floor and a ceiling;

FIG. 2 is a fragmentary sectional elevation of the embodiment of FIG. 1, showing upper and lower segments;

FIG. 3 is an elevational view of a cantilever beam separated from the vertical column;

In the various Figures like numerals are used to identify like parts.

DESCRIPTION OF THE PREFERRED EMBODIMENTS

Figure 4:
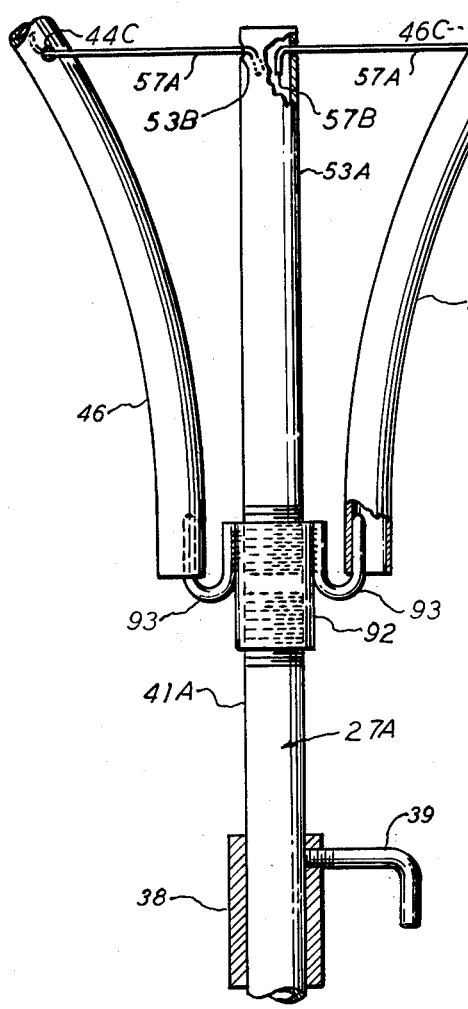
FIG. 4 is a fragmentary sectional elevation of the lock collar, shaft and post of an alternate embodiment of the invention.
Figure 6:
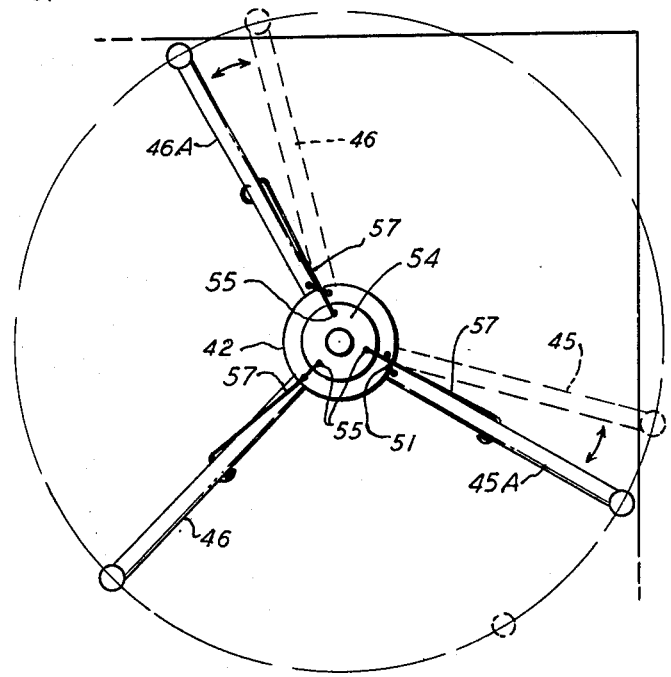
FIG. 6 is a plan view of the apparatus of FIG. 1.
Figure 5:
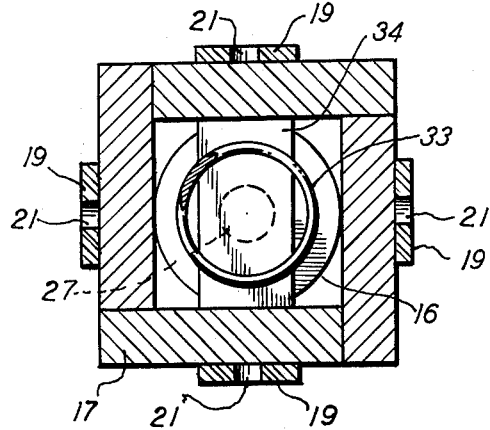
FIG. 5 is a plan section taken along line 5—5 of FIG. 2.

In FIGS. 1 through 6 a support column 11 in accordance with the invention is shown extending between a floor 12 and a ceiling 13. The support column comprises a vertical column 15 rising from a floor pad 16. The vertical column has a plurality of planar sides like the side 17 of FIG. 1. Each side 17 has a fastener band 19 fixed to extend vertically on a side. As can be seen from FIGS. 2 and 5, each of the fastener bands has a plurality of vertically spaced holes 21 which are preferably equally spaced along the vertical axis of the fastener band. The bands may be held to flat sides 17 by recessed flathead screws such as the screws 23 of FIG. 2.

The column has a top cover 25 with an orifice 26 through which a shaft 27 is reciprocable. An inner shank 28 of the shaft has a collar 29 which a pin 31 restrains on the shaft against the thrust of a compression spring 33 which seats against a lower cross brace 34 running from side to side within the vertical column. A rest plate 37 against the under surface of top cover 25 supports a lock collar 38 which has a threaded set screw 39 which is turnable to lock against an outer shank 41 of shaft 27.

A flange 42 is fixed to the outer extreme of shank 41. Three thrust arms 44, 45, 46 are secured to flange 42 at one end and each extends arcuately upwardly and away from the flange to a padded tip 49. The bottom end of each thrust arm 44–46 is articulately secured to the flange by a wire ring 51 which passes through holes in both flange and the arm in order to maintain the upward attitude of the thrust arms with respect to the vertical column. A support post 53 fixed to shaft 27 rises above flange 42 and terminates in a collar 54. The collar has three apertures 55 (FIG. 6) and a tension tie 57 extends between each thrust arm and the collar 54. The relative attitude of the thrust arms to each other and to the vertical column is thus loosely maintained by articulated rings 51 and tension ties 57. However, the arms have some degree of freedom both to adjust to irregular ceiling surfaces and to deviate from normal 120 degree separation between thrust arms to accommodate a position of the vertical column proximate a vertical wall, as shown by the displaced arms 45A, 47A of FIG. 6.

In FIG. 1 a cantilever beam 61 is shown having a support surface 62 and a diagonal brace 63 extending from a fastener bar 64 which butts against a smooth surface of a fastener band 19. Fastener bar 64 has spaced pegs protruding therefrom which engage the orifices 21 of the fastener band. Such pegs are shown with respect to a cantilever support beam 71 of FIG. 3 in which a fastener bar 64A has protruding pegs 65, 66 spaced apart a multiple of the vertical increment between orifices 21. As can be seen from FIG. 3, cantilever support beam 71 comprises an upper arm 73 and a lower arm 74 at a converging angle outwardly to arm 73, both extending from opposite ends of fastener bar 64A. A connector 75 at the outer ends of arms 73, 74 extends above the top surface of cantilever arm 73 in a retainer ridge 76. Thus, as is apparent from FIG. 1, a rope-supported planter 78 is more conveniently retained on the edge of arm 73 than on surface 62 which has no retainer edge. A decorative scroll 79 may fill the space between arms 73 and 74 and also serve as a brace.

Turning again to FIG. 1 it can be seen that several different types of support beams may be a part of the inventive combination. The beam 61 holding planter basket 78 may have an inverted form as shown at 61A on another side of the pole from that side 17 from which beam 61 projects. Two support beams 71 are shown projecting from adjacent sides 17 of the vertical column in FIG. 1.

A second pair of support beams 71 are shown in FIG. 1 attached to fastener bands 19 of opposite faces and supporting a semi-circular table top 81 which has a notch 82 to fit the table about the vertical column. Being in opposite faces support beams 71 supporting the table top extend from the post in a straight line. The table edge may be clamped to the beams or a third support beam (not shown) may be attached to the fastener band of the intervening vertical column side 17 to give the table top three point support. In similar fashion four planar support beam surfaces like surface 62 may be arranged about the post to support a variety of different objects which need only be apertured at their center to accommodate to the support of the column of the invention.

FIG. 4 shows an alternative embodiment having a thrust arm assembly 91 supported by a shaft 27A from a column 15 and lock collar 38 similar to those of the previous embodiments. A coupling 92 joins a post to the outer end of the shaft. The shaft post and coupling may be conventional pipe components.

A plurality of U-shaped hooks 93 is fixed to the coupling to define a support assembly for thrust arms like the arms 44, 46 of FIG. 4. Each thrust arm rests on a limb of a hook and is articulately restrained radially by wire ties 57A secured by bent ends 57B in apertures 53B of the post. Bent wire ends 57C in the apertures 44C, 46C of the thrust arms secure the arms intermediate their upward reach in articulate fashion.

Figure 7:
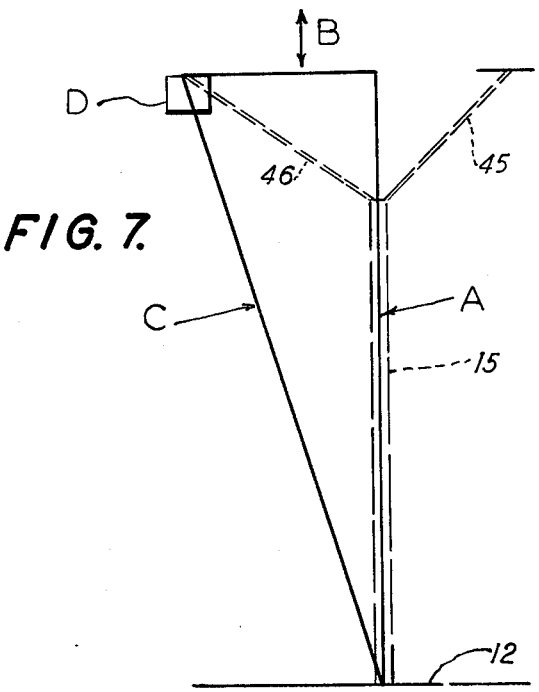
FIG. 7 is a diagram of the force geometry of the apparatus of the invention.

FIG. 7 illustrates geometrically a unique force arrangement from which the invention derives its ability to sustain considerable weight at a distance from the vertical axis from the support column. Vertical column 15 is represented by the vertical broken lines of FIG. 7 and the articulated thrust arms 46, 47 are indicated by the diagonal broken lines. A vector diagram has sides A, B, and C with weight D shown at the juncture of side B and C. Any weight displaced from the axis has the effective length B to resist side thrust against the column to remove it from its axis and cause its collapse.

While various embodiments of the invention have been shown and described it is obvious that variations within the scope of the invention will occur to those skilled in this particular art. It is therefore desired that the invention be measured by the appended claims rather than by the illustrative embodiments shown and described herein.

I claim:

1. A support pole for placement between floor and ceiling and comprising a hollow column, a floor pad at an end of the column, an adjustable shaft movable at the other end of the column, resilient means biasing the shaft relative to the column, a plurality of thrust arms adapted to thrust against said ceiling to secure said thrust arms with respect to said ceiling; articulated means securing the thrust arms to the outer end of said shaft to diverge therefrom uniformly, said articulated means including a support assembly at the end of the adjustable shaft remote from the column, a support post extending from the support assembly, a pivot securing each thrust arm for articulation to the support assembly, and a tie extending from the post to each thrust arm intermediate the length of the thrust arm; a plurality of independent fastening bands fixed to the exterior of the column, and at least one cantilever support adapted to engage a fastener band and extend away from the column.

* * * * *